No. 856,462. PATENTED JUNE 11, 1907.
F. G. GIES.
REVERSING GEAR.
APPLICATION FILED MAY 29, 1905.
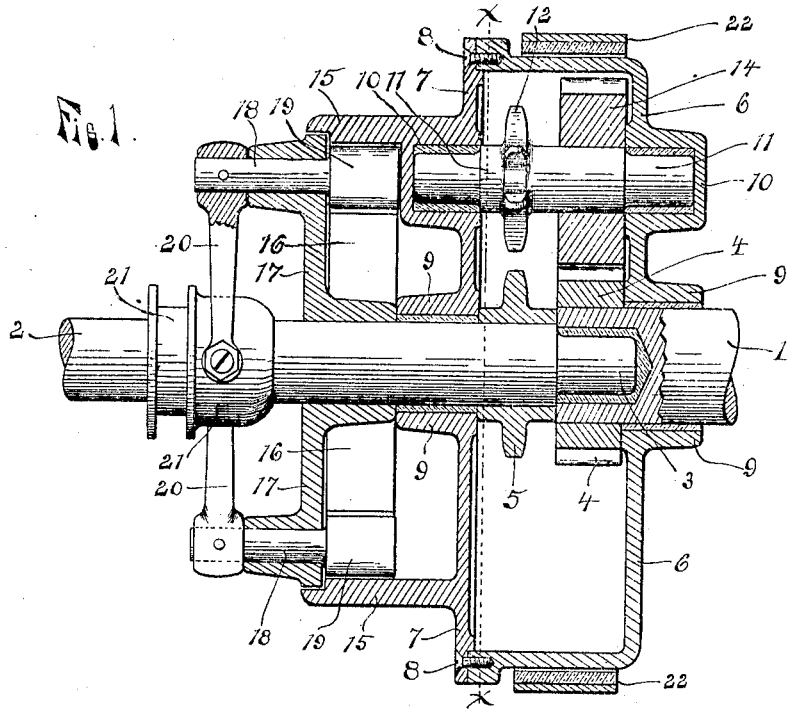
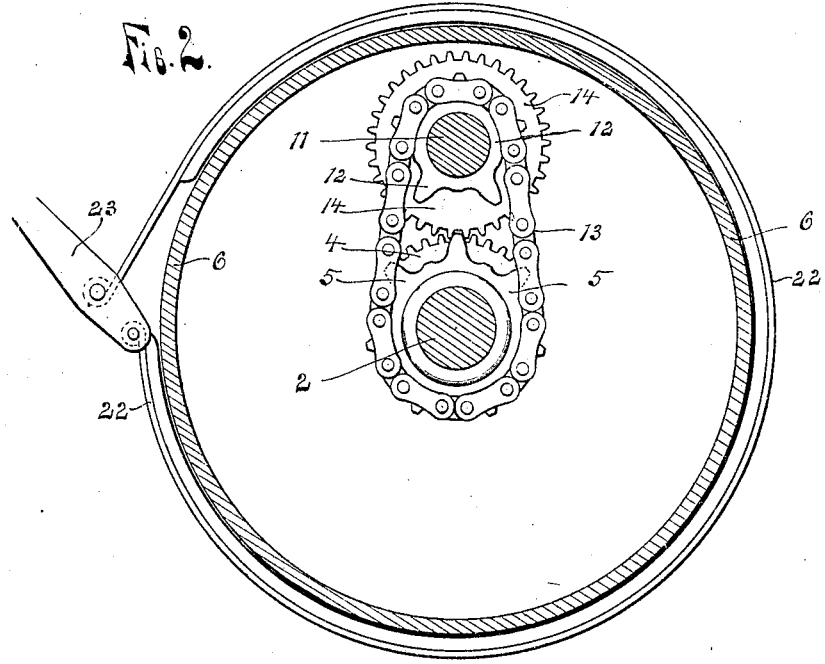
WITNESSES:
INVENTOR.
Frank G. Gies
BY
ATTORNEYS

UNITED STATES PATENT OFFICE.

FRANK G. GIES, OF DETROIT, MICHIGAN, ASSIGNOR TO GIES GEAR COMPANY, OF DETROIT, MICHIGAN, A CORPORATION OF MICHIGAN.

REVERSING-GEAR.

No. 856,462.  Specification of Letters Patent.  Patented June 11, 1907.

Application filed May 29, 1905. Serial No. 262,778.

*To all whom it may concern:*

Be it known that I, FRANK G. GIES, a citizen of the United States of America, residing at Detroit, in the county of Wayne and State of Michigan, have invented certain new and useful Improvements in Reversing-Gear, of which the following is a specification, reference being had therein to the accompanying drawings.

This invention relates to improvements in reversing-gears especially adapted for use in motor boats or gasolene launches in which the driven shaft is supported in axial alinement with the driving or engine shaft, and the object of the invention is to provide an efficient device for the purpose which is so constructed that when the driven shaft is being turned in the same direction as the driving shaft, the device will operate as a solid connection between the two, turning therewith, and when said driven shaft is being turned in a reverse direction the minimum number of moving parts will be employed to accomplish the result and the power will be transmitted directly through these parts, thus securing a very simple, compact, durable and almost noiseless gearing.

To this end the invention consists in employing sprocket wheels and a sprocket chain, together with intermeshing gears, to reverse the motion, and in providing a device having the several advantages of the particular arrangement, construction, and combination of parts, all as hereinafter more fully described, reference being had to the accompanying drawing, in which Figure 1, is a longitudinal section of a device embodying the invention; and Fig. 2, a transverse section of the same on the line *x—x* of Fig. 1.

As shown in the drawing, 1 is the driving and 2 the driven shaft, which shafts extend in axial alinement with each other, the driving shaft being formed at one end with a socket to receive and support the reduced end 3 of the driven shaft. Keyed or otherwise secured upon the extreme inner end of the driving shaft is a gear or pinion 4 and similarly secured upon the driven shaft adjacent thereto is a sprocket wheel 5. A circular casing 6 having a removable end 7 secured in place by screws 8, is provided with bearings 9 for the said shafts upon which it turns freely, said casing being of just sufficient length to take in the said gear and sprocket, its bearings 9 engaging the shafts at the outer side of said gear and sprocket. Bearings 10 are provided in the end walls of the casing for the counter-shaft 11 which is formed with or has secured thereto a sprocket wheel 12 engaging a sprocket chain 13 which also engages the sprocket 5, and has secured thereto a gear or pinion 14 in mesh with the gear 4. One set of sprockets and chains is shown in the drawing, but it is evident that by widening the casing two or more might be employed, the corresponding number of gears 14, all being arranged to mesh with the one gear 4.

Extending longitudinally of the driven shaft outward from the removable head or side 7 of the casing is a circular flange or rim 15 provided with an internal face or seat for the expanding-clutch segments 16, and secured in any suitable manner to the driven shaft to turn therewith are the outwardly extending arms 17 provided with bearings at their outer ends for short rock-shafts 18 formed at their inner ends with cam-members 19 to engage between the adjacent ends of the clutch segments, and when turned by means of the operating arms 20 on the outer ends of said shafts, to expand said segments within the flange 15 into engagement with its inner surface and frictionally lock the casing to the driven shaft. A sleeve 21 on said driven shaft adapted to be moved longitudinally thereon in any suitable manner, is provided with an incline at one end to engage between the ends of the arms 20 and the shaft and move said arms to operate the clutch. I have shown this old and well known construction and arrangement of clutch and its operating means, as it is particularly adapted for use with this device, but any other suitable form of clutch may be used to secure the casing to the driven shaft.

Encircling the peripheral face of the casing is a friction band 22 which is operated by any suitable means, as a lever 23, to clamp the casing, and is secured to any suitable stationary support (not shown) to prevent its moving and to firmly hold the casing from turning. Any other suitable means for holding the casing may be used if desired.

When the clamping band is operated to prevent the casing from turning and the clutch is released to disconnect the driven shaft from the casing, power will be transmitted from the driving shaft directly through the gears and sprocket chain to the driven shaft, turning the same in a direction opposite to that in which the driving shaft is being turned. This arrangement gives a very direct transmission of power with the use of but two gears, reducing friction and consequent loss of power to the minimum and giving a construction which is almost noiseless in its operation. The casing being held from turning during the reverse driving, also reduced friction and noise below that of a device employing a planetary movement of the gears and which arrangement necessitates the use of a revolving casing.

By releasing the clamping band and operating the clutch, the casing is secured to the driven shaft to turn therewith and the gears thus interlocked, motion being transmitted through the interlocked gears and casing from the driving to the driven shaft. The gears and sprockets are thus carried around by the casing without moving relatively to each other and they therefore are not subjected to wear and make no noise.

Having thus fully described my invention, what I claim is:—

In a reversing gear, the combination of a driving and a driven shaft, a pinion on one and a sprocket on the other, a casing inclosing the pinion and sprocket and turning about said shafts and provided with an annular flange, a combined sprocket and pinion carried by said casing, the pinion carried by the casing engaging that carried by the shaft, a sprocket chain engaging the two sprockets a brake band encircling the said annular flange, and means for contracting the brake band to clamp the said flange.

In testimony whereof I affix my signature in presence of two witnesses.

FRANK G. GIES.

Witnesses:
OTTO F. BARTHEL,
THOS. G. LONGSTAFF.